(12) United States Patent
Nguyen

(10) Patent No.: US 10,488,493 B2
(45) Date of Patent: Nov. 26, 2019

(54) SENSOR ARRAY FOR AUTONOMOUS VEHICLE

(71) Applicant: DENSO International America, Inc., Southfield, MI (US)

(72) Inventor: Trong Duy Nguyen, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 456 days.

(21) Appl. No.: 15/277,620

(22) Filed: Sep. 27, 2016

(65) Prior Publication Data

US 2018/0086280 A1  Mar. 29, 2018

(51) Int. Cl.
| | |
|---|---|
| G01S 7/481 | (2006.01) |
| G01S 17/93 | (2006.01) |
| G01S 13/93 | (2006.01) |
| G05D 1/02 | (2006.01) |

(52) U.S. Cl.
CPC .......... *G01S 7/4813* (2013.01); *G01S 17/936* (2013.01); *G01S 2013/9371* (2013.01); *G05D 1/02* (2013.01)

(58) Field of Classification Search
CPC ........ G01S 7/4813; G01S 17/87; G01S 17/88; G01S 17/93; G01S 17/936; G01S 2013/9371; G01S 2013/9382; G01S 2013/9385
See application file for complete search history.

(56) References Cited

U.S. PATENT DOCUMENTS

| | | | |
|---|---|---|---|
| 5,003,911 A | 4/1991 | Keil | |
| 5,266,955 A * | 11/1993 | Izumi | .................... G01S 17/936 342/54 |
| 5,349,361 A | 9/1994 | Egashira et al. | |
| 5,491,464 A * | 2/1996 | Carter | .................. B60Q 1/2611 340/425.5 |
| 6,072,391 A * | 6/2000 | Suzuki | ................... B60K 35/00 340/435 |
| 8,137,008 B1 * | 3/2012 | Mallano | .................. B60R 11/04 396/427 |
| 9,802,656 B1 * | 10/2017 | Williams | ................ G01S 13/89 |
| 9,884,584 B1 * | 2/2018 | Lackemeyer | .......... B60Q 1/482 |
| 2003/0076415 A1 | 4/2003 | Strumolo | |
| 2014/0218530 A1 * | 8/2014 | Sinclair | .................... G08G 1/00 348/148 |
| 2014/0350801 A1 * | 11/2014 | Bonefas | ............... A01D 43/087 701/50 |
| 2016/0328629 A1 * | 11/2016 | Sinclair | ................ H04N 5/2253 |
| 2017/0190300 A1 * | 7/2017 | Maranville | ............... B60R 9/04 |
| 2017/0223889 A1 * | 8/2017 | Cavender-Bares | ......................... A01B 69/008 |
| 2018/0065242 A1 * | 3/2018 | Tanaka | ..................... B25J 5/007 |

FOREIGN PATENT DOCUMENTS

WO  WO-2013177650 A1  12/2013

* cited by examiner

*Primary Examiner* — Eric L Bolda

(74) *Attorney, Agent, or Firm* — Harness, Dickey & Pierce, P.L.C.

(57) ABSTRACT

A sensor array for an autonomous vehicle. The sensor array includes a center sensor mounted to a center sensor mounting device, which is configured to telescope to adjust a height of the center sensor. A first side sensor is mounted to a first side sensor mounting device, which is configured to pivot to adjust an angle of the first side sensor. A second side sensor is mounted to a second side sensor mounting device, which is configured to pivot to adjust an angle of the second side sensor.

17 Claims, 2 Drawing Sheets

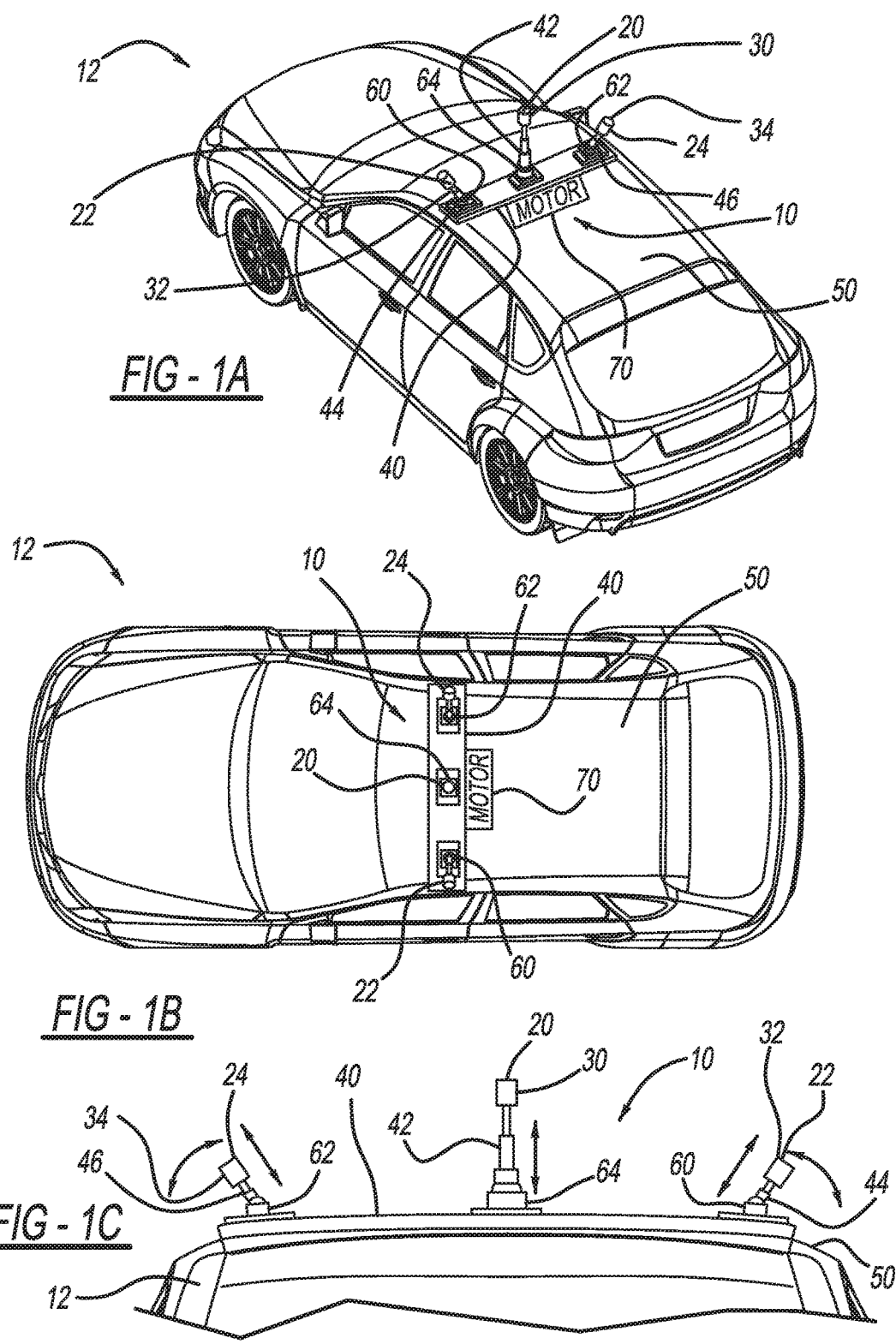

SENSOR ARRAY FOR AUTONOMOUS VEHICLE

FIELD

The present disclosure relates to a sensor array for an autonomous vehicle.

BACKGROUND

This section provides background information related to the present disclosure, which is not necessarily prior art.

Autonomous vehicles typically include an array of sensors that continuously scan the environment about the vehicle and act as the "eyes" of the autonomous vehicle system. It is thus important that the sensors have the greatest possible field of vision. While current autonomous vehicle sensors and sensor arrays are suitable for their intended use, they are subject to improvement. For example, it would be desirable to have a sensor array for an autonomous vehicle that provides autonomous vehicle sensors with an enhanced field of vision. The present teachings address this need in the art, as well as numerous others.

SUMMARY

This section provides a general summary of the disclosure, and is not a comprehensive disclosure of its full scope or all of its features.

The present teachings provide for a sensor array for an autonomous vehicle. The sensor array includes a center sensor mounted to a center sensor mounting device, which is configured to telescope to adjust a height of the center sensor. A first side sensor is mounted to a first side sensor mounting device, which is configured to pivot to adjust an angle of the first side sensor. A second side sensor is mounted to a second side sensor mounting device, which is configured to pivot to adjust an angle of the second side sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1A is a perspective view of a vehicle including a sensor array according to the present teachings;

FIG. 1B is a top view of the vehicle of FIG. 1A including the sensor array of the present teachings;

FIG. 1C is a rear view of the sensor array in accordance with the present teachings;

Corresponding reference numerals indicate corresponding parts throughout the several views of the drawings.

DETAILED DESCRIPTION

Figure 2A:
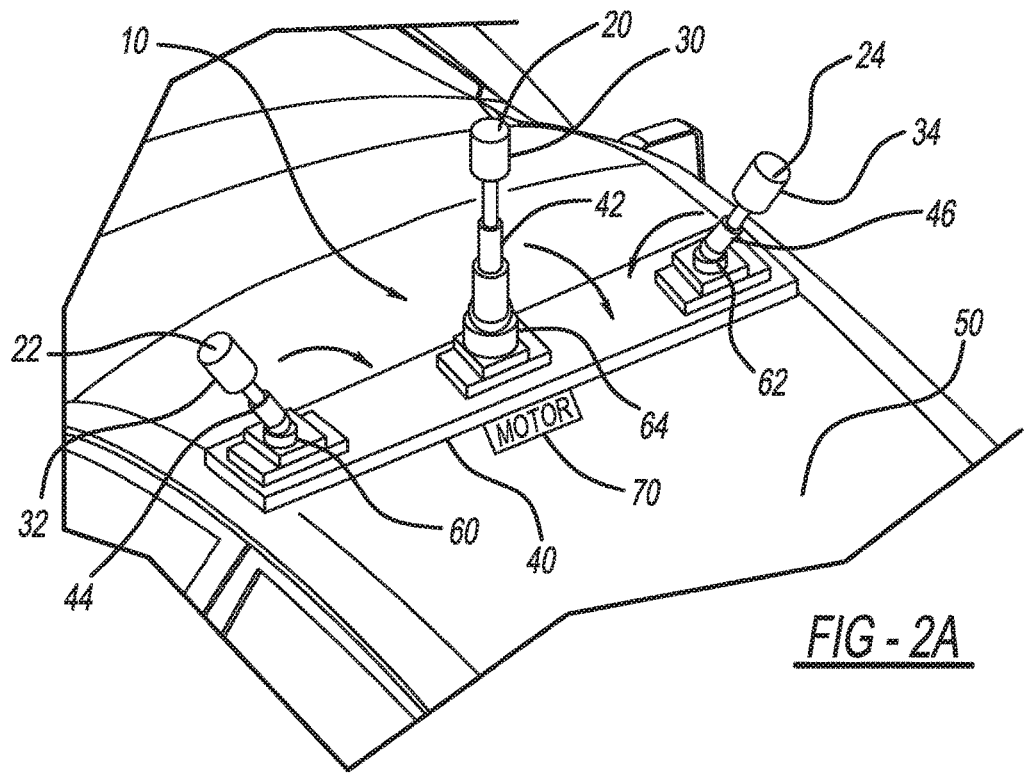
FIG. 2A is a perspective view of the sensor array of FIG. 1A with sensors thereof in an active position.

Example embodiments will now be described more fully with reference to the accompanying drawings.

With initial reference to FIGS. 1A, 1B, and 1C, a sensor array 10, which is in accordance with the present teachings, is mounted to an autonomous vehicle 12. Although the autonomous vehicle 12 is illustrated as a passenger vehicle, the sensor array 10 is configured for use with any suitable autonomous vehicle or device, such as any suitable type of passenger vehicle, mass transit vehicle, military vehicle, commercial vehicle, construction equipment, delivery vehicle, aircraft, watercraft, etc.

The sensor array 10 generally includes a center sensor 20, a first side sensor 22, and a second side sensor 24. The center sensor 20 includes a housing 30, which houses sensing components of the center sensor 20. The first side sensor 22 includes a housing 32, which houses sensing components of the first side sensor 22. The second side sensor 24 includes a housing 34, which houses sensing components of the second side sensor 24. The sensors 20, 22, and 24 can be any suitable sensors configured for use with an autonomous vehicle. For example, the sensors 20, 22, and 24 can be LIDAR sensors. When configured as LIDAR sensors, the housings 30, 32, and 34 of the sensors 20, 22, and 24 respectively include laser emitters, laser receivers, and any other suitable LIDAR autonomous vehicle sensor components. Each one of the housings 30, 32, and 34 can be configured to rotate to facilitate scanning of the environment.

Each one of the sensors 20, 22, and 24 can be mounted to a base 40. The base 40 can in turn be mounted to the autonomous vehicle 12, such as a roof 50 thereof, in any suitable manner. The center sensor 20 is mounted to the base 40 with a center sensor mounting device 42. The first side sensor 22 is mounted to the base 40 with a first side sensor mounting device 44. The second side sensor 24 is mounted to the base 40 with a second side sensor mounting device 46. Alternatively, each one of the sensor mounting devices 42, 44, and 46 may be mounted directly to the autonomous vehicle 12.

The center sensor mounting device 42 can be any suitable mounting device configured to telescope to various different heights in order to arrange and support the center sensor 20 at any suitable height above the vehicle 12 to maximize the field of vision of the center sensor 20. The sensor array 10 can include any suitable motor configured to raise and lower the center sensor 20.

The first side sensor mounting device 44 is configured to telescope and pivot in order to position and support the first side sensor 22 at any suitable location to maximize the field of vision of the first side sensor 22. Specifically and with reference to FIG. 1C, for example, the first side sensor mounting device 44 can telescope in and out to position the first side sensor 22 at any suitable height above the autonomous vehicle 12. Furthermore, the first side sensor mounting device 44 can include any suitable hinge 60 configured to pivot the first side sensor 22 to an optimal position to maximize the field of vision of the first side sensor 22. For example, the first side sensor mounting device 44 and the hinge 60 thereof can pivot the first side sensor 22 outward or inward relative to the left hand side of the vehicle 12.

The second side sensor mounting device 46 is configured in a manner similar to the first side sensor mounting device 44 and thus the description of the first side sensor mounting device 44 is sufficient to describe the second side sensor mounting device 46. The only substantial difference between the first and second side sensor mounting devices 44 and 46 is that the second side sensor mounting device 46 is configured to pivot the second side sensor 24 outward and inward with respect to a right hand side of the vehicle 12.

The second side sensor mounting device 46 includes a second hinge 62. Each one of the first and second side sensor mounting devices 44 and 46 is configured to pivot to any suitable angle.

With continued reference to FIGS. 1A, 1B, and 1C, and additional reference to FIGS. 2A and 2B, movement of the sensors 20, 22, and 24 from an active position (FIG. 2A) to an inactive or storage position (FIG. 2B) will now be described. In the active position of FIG. 2A, each one of the sensors 20, 22, and 24, and the mounting devices 42, 44, and 46 thereof, is generally upright to maximize the field of vision of each one of the sensors 20, 22, and 24. When the sensor array 10 is not in use, each one of the sensors 20, 22, and 24 can be moved to the storage position of FIG. 2B. In the storage position of FIG. 2B, the center sensor 20 is rotated generally 90° from the active position of FIG. 2A such that the center sensor mounting device 42 extends generally parallel to a roof of the vehicle 12.

Figure 2B:
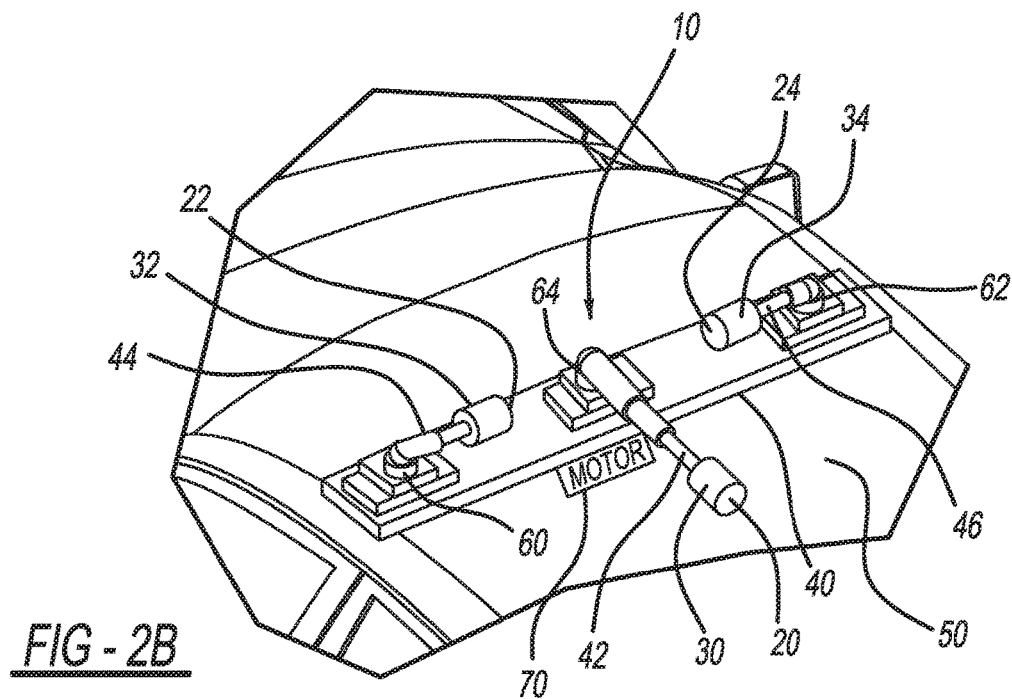
FIG. 2B is a perspective view of the sensor array of FIG. 1A with the sensors thereof in an inactive position.

To move from the active position of FIG. 2A to the storage position of FIG. 2B, the center sensor mounting device 42 pivots or rotates about a hinge 64. The center sensor mounting device 42 can be rotated manually or by a motor 70 of the sensor array 10. To move the first and second side sensors 22 and 24 from the active positions of FIG. 2A to the storage positions of FIG. 2B, the first and second side sensor mounting devices 44 and 46 pivot about their respective hinges 60 and 62, to move the first and second side sensors 22 and 24 towards a center of the vehicle 12 and towards the center sensor mounting device 42. In the storage position of FIG. 2B the first and second side sensor mounting devices 44 and 46 extend generally parallel to the roof 50 of the vehicle 12 so as not to substantially extend from the roof 50. In the storage position of FIG. 2B, each one of the sensors 20, 22, and 24 is advantageously protected, such as from carwash machinery.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A sensor array for an autonomous vehicle, the sensor array comprising:
   a center sensor mounted to a center sensor mounting device configured to telescope to adjust a height of the center sensor and move the center sensor parallel to a length of the autonomous vehicle that the sensor array is mounted to move the center sensor between an active position and a storage position;
   a first side sensor mounted to a first side sensor mounting device configured to pivot to adjust an angle of the first side sensor and move the first side sensor perpendicular to the length of the autonomous vehicle that the sensor array is mounted to move the first side sensor between an active position and a storage position;
   a second side sensor mounted to a second side sensor mounting device configured to pivot to adjust an angle of the second side sensor and move the second side sensor perpendicular to the length of the autonomous vehicle that the sensor array is mounted to move the second side sensor between an active position and a storage position; and
a base to which is mounted each one of the center sensor mounting device, the first side sensor mounting device, and the second side sensor mounting device;
wherein the base is configured to be mounted to a roof of the autonomous vehicle.

2. The sensor array of claim 1, wherein each one of the center sensor, the first side sensor, and the second side sensor is a LIDAR sensor.

3. The sensor array of claim 1, wherein each one of the center sensor, the first side sensor, and the second side sensor includes a housing with LIDAR lasers therein.

4. The sensor array of claim 1, wherein:
the first side sensor mounting device is configured to telescope to vary a height of the first side sensor; and
the second side sensor mounting device is configured to telescope to vary a height of the second side sensor.

5. The sensor array of claim 1, wherein the center sensor mounting device is configured to rotate the center sensor to move the center sensor from the active position to the storage position.

6. The sensor array of claim 1, wherein the center sensor mounting device is configured to rotate the center sensor towards a rear of the vehicle from the active position to the storage position.

7. The sensor array of claim 6, wherein:
the first side sensor mounting device is configured to move the first side sensor towards the center sensor to move the first side sensor from the active position to the storage position; and
the second side sensor mounting device is configured to move the second side sensor towards the center sensor to move the second side sensor from the active position to the storage position.

8. The sensor array of claim 6, wherein:
the first side sensor mounting device is configured to rotate the first side sensor towards the center sensor to move the first side sensor from the active position to the storage position; and
the second side sensor mounting device is configured to rotate the second side sensor towards the center sensor to move the second side sensor from the active position to the storage position.

9. The sensor array of claim 1, further comprising a motor mounted to the base and configured to move at least one of the center sensor mounting device, the first side sensor mounting device, and the second side sensor mounting device.

10. The sensor array of claim 1, wherein the sensor array has only three sensors consisting of the center sensor, the first side sensor, and the second side sensor.

11. A sensor array for an autonomous vehicle, the sensor array comprising:
a base to which is mounted each one of a first side sensor mounting device, a second side sensor mounting device, and a center sensor mounting device arranged between the first side sensor mounting device and the second side sensor mounting device;
a center sensor mounted to the center sensor mounting device configured to telescope to adjust a height of the center sensor, and configured to move the center sensor parallel to a length of the autonomous vehicle to which the sensor array is mounted from an active position in which the center sensor is generally vertical relative to the base to a storage position in which the center sensor is generally horizontal relative to the base;
a first side sensor mounted to the first side sensor mounting device configured to pivot to adjust an angle of the first side sensor, and configured to move the first side sensor perpendicular to the length of the autonomous vehicle to which the sensor array is mounted from an active position in which the first side sensor is generally vertical relative to the base to a storage position in which the first side sensor is generally horizontal relative to the base; and
a second side sensor mounted to the second side sensor mounting device configured to pivot to adjust an angle of the second side sensor, and configured to move the second side sensor perpendicular to the length of the autonomous vehicle to which the sensor array is mounted from an active position in which the second side sensor is generally vertical relative to the base to a storage position in which the second side sensor is generally horizontal relative to the base;
wherein the sensor array has only three sensors consisting of the center sensor, the first side sensor, and the second side sensor; and
wherein the base is configured to be mounted to a roof of the autonomous vehicle.

12. The sensor array of claim 11, wherein each one of the center sensor, the first side sensor, and the second side sensor includes a housing with LIDAR lasers therein.

13. The sensor array of claim 11, wherein:
the first side sensor mounting device is configured to telescope to vary a height of the first side sensor; and
the second side sensor mounting device is configured to telescope to vary a height of the second side sensor.

14. The sensor array of claim 11, wherein the center sensor mounting device is configured to:
rotate the center sensor towards a rear of the autonomous vehicle that the sensor array is mounted to move the center sensor from the active position to the storage position.

15. The sensor array of claim 11, further comprising a motor mounted to the base and configured to move at least one of the center sensor mounting device, the first side sensor mounting device, and the second side sensor mounting device.

16. The sensor array of claim 11, wherein each one of the center sensor mounting device, the first side sensor mounting device, and the second side sensor mounting device includes a hinge.

17. The sensor array of claim 14, wherein:
the first side sensor mounting device is configured to rotate the first side sensor towards the center sensor to move the first side sensor from the active position to the storage position; and
the second side sensor mounting device is configured to rotate the second side sensor towards the center sensor to move the second side sensor from the active position to the storage position.

* * * * *